US008218606B2

(12) United States Patent
Jonsson

(10) Patent No.: US 8,218,606 B2
(45) Date of Patent: Jul. 10, 2012

(54) METHOD AND APPARATUS FOR DIRECT ESTIMATION OF IMPAIRMENT CORRELATIONS FOR RECEIVED SIGNAL PROCESSING

(75) Inventor: Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 742 days.

(21) Appl. No.: 12/423,480

(22) Filed: Apr. 14, 2009

(65) Prior Publication Data

US 2010/0260237 A1    Oct. 14, 2010

(51) Int. Cl.
*H04B 1/69* (2011.01)
(52) U.S. Cl. .......................................... 375/150; 375/148
(58) Field of Classification Search ................... 375/130, 375/140, 144, 145, 147, 148, 150, 260, 267, 375/285, 316, 340, 346, 347, 350, 354, 362–368; 370/335, 342, 441, 503, 509–515
See application file for complete search history.

(56) References Cited

U.S. PATENT DOCUMENTS

| 7,397,842 | B2 | 7/2008 | Bottomley et al. | |
|---|---|---|---|---|
| 7,486,716 | B2 | 2/2009 | Fulghum et al. | |
| 7,751,463 | B2 * | 7/2010 | Bottomley et al. | 375/142 |
| 7,769,078 | B2 * | 8/2010 | Cairns et al. | 375/147 |
| 7,822,101 | B2 * | 10/2010 | Reial | 375/144 |
| 7,949,063 | B2 * | 5/2011 | Jonsson et al. | 375/267 |
| 2005/0201447 | A1 | 9/2005 | Cairns et al. | |
| 2005/0215218 | A1 | 9/2005 | Bottomley et al. | |
| 2006/0251156 | A1 | 11/2006 | Grant et al. | |
| 2006/0291543 | A1 | 12/2006 | Fulghum et al. | |
| 2007/0047628 | A1 | 3/2007 | Fulghum et al. | |
| 2007/0098048 | A1 | 5/2007 | Cairns et al. | |
| 2007/0253514 | A1 | 11/2007 | Guevorkian et al. | |
| 2008/0002759 | A1 | 1/2008 | Cairns et al. | |
| 2008/0310562 | A1 * | 12/2008 | Reial et al. | 375/346 |
| 2009/0304132 | A1 * | 12/2009 | Cairns et al. | 375/347 |
| 2011/0293049 | A1 * | 12/2011 | Niewczas et al. | 375/344 |

FOREIGN PATENT DOCUMENTS

| WO | 2005/096518 A1 | 10/2005 |
|---|---|---|
| WO | 2007/093336 A1 | 8/2007 |
| WO | 2008/154653 A2 | 12/2008 |

OTHER PUBLICATIONS

Hai, W. et al. "Approaches for Fast, Adaptive, Generalized Rake Reception." Research Disclosure Journal, RD 475041, Nov. 2003.

(Continued)

*Primary Examiner* — Tesfaldet Bocure
(74) *Attorney, Agent, or Firm* — Coats & Bennett, P.L.L.C.

(57) ABSTRACT

According to the teachings disclosed in this document, a receiver estimates impairment correlations for a received signal using received pilot values. This direct estimation of impairment correlations based on direct pilot observations, provides for a rich capture of all impairment sources bearing on the received signal. Advantageously, however, estimation noise is reduced by generating a structured covariance matrix from the measured covariance matrix, and carrying out structured filtering within the structured covariance matrix. Structured filtering involves averaging matrix elements that correspond to the same processing delay difference as used for measured impairment correlation estimation. In one or more embodiments, averaged net channel estimates are used to obtain a rank one matrix, which is used to convert a measured covariance matrix to a structured covariance matrix, for carrying out structured filtering.

24 Claims, 4 Drawing Sheets

OTHER PUBLICATIONS

Bottomley, G. E. et al. "A Generalized RAKE Receiver for Interference Suppression." IEEE Journal on Selected Areas in Communications, vol. 18, No. 8, Aug. 2000, pp. 1536-1545.

Jonsson, E. et al. "Speed-Based, Hybrid/Non-parametric Equalization." Co-pending U.S. Appl. No. 12/107,623, filed Apr. 22, 2008.

Cairns, D. A. et al. "Method and Apparatus for Efficient Estimation of Interference in a Wireless Router." Co-pending U.S. Appl. No. 12/133,636, filed Jun. 5, 2008.

Fulghum, T.L. "Multi-Pass Parameter Estimation for G-RAKE Receiver." Co-pending U.S. Appl. No. 11/954,460, filed Dec. 12, 2007.

* cited by examiner

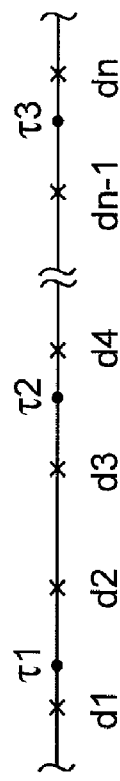

FIG. 2

$\begin{bmatrix} h_1 \\ h_2 \\ \vdots \\ h_n \end{bmatrix}$

AVG. NET CHAN. EST. $h^{mean}$

FIG. 3

$\begin{bmatrix} c_{11} & c_{12} & c_{13} & \cdots & c_{1n} \\ c_{21} & c_{22} & c_{23} & \cdots & c_{2n} \\ & & \vdots & & \\ c_{n1} & c_{n2} & c_{n3} & \cdots & c_{nn} \end{bmatrix}$ MEASURED COV. MATRIX $R^{meas}$

FIG. 4

$\begin{bmatrix} b_{11} & b_{12} & b_{13} & \cdots & b_{1n} \\ b_{21} & b_{22} & b_{23} & \cdots & b_{2n} \\ & & \vdots & & \\ b_{n1} & b_{n2} & b_{n3} & \cdots & b_{nn} \end{bmatrix}$

RANK ONE MATRIX B

FIG. 5

$\begin{bmatrix} s_{11} & s_{12} & s_{13} & \cdots & s_{1n} \\ s_{21} & s_{22} & s_{23} & \cdots & s_{2n} \\ & & \vdots & & \\ s_{n1} & sb_{n2} & s_{n3} & \cdots & s_{nn} \end{bmatrix}$ STRUCTURED COV. MATRIX $R^{struct}$

FIG. 6

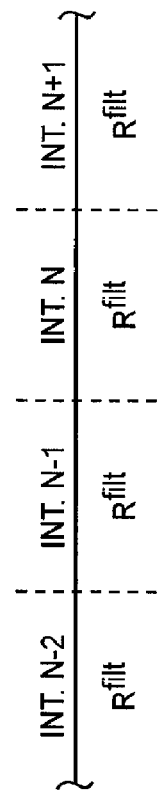

METHOD AND APPARATUS FOR DIRECT ESTIMATION OF IMPAIRMENT CORRELATIONS FOR RECEIVED SIGNAL PROCESSING

TECHNICAL FIELD

The present invention generally relates to interference suppression in received communication signal processing, and particularly relates to reducing estimation noise in impairment correlations determined for a received signal through direct measurement, such as is done in a non-parametric Generalized Rake (G-Rake) receiver.

BACKGROUND

Impairment correlation estimation plays an important role in communication signal processing, because such estimation provides for the suppression of correlated interference. A primary example of correlation-based processing is the Generalized Rake (G-Rake) receiver, as generally described in Bottomley, Ottosson, and Wang, "A Generalized RAKE Receiver for Interference Suppression," IEEE *J. Sel. Areas Commun.*, vol. 18, No. 8 (August 2000). See, also, U.S. Pat. No. 7,397,842 to Bottomley, et al. Of course, the same or similar impairment correlation processing is used in equivalent receiver architectures, such as Chip Equalization (CE) architectures.

Several challenges arise in estimating impairment correlations. For example, the estimations should be relatively free of estimation noise. One approach to reducing estimation noise involves time filtering, where impairment correlation estimates are filtered over a number of signal intervals, and the filtered estimates are used for generating signal combining weights. While time filtering can be extended as needed to obtain a desired level of noise suppression, this approach undesirably masks underlying changes in the actual interference conditions at the receiver, where those changes ideally would be reflected in the impairment correlation estimates.

The ability to track changing interference conditions is becoming increasingly useful, because scheduled, high-power data transmissions in the newer communication networks, such as with HSPDA services in Wideband CDMA, produce significant changes in the type and source of received signal interference incurred by a given receiver over multiple transmission intervals. There are known approaches to producing correlation estimates that are more responsive to fast fading, and changing interference conditions.

For example, U.S. Pat. No. 7,486,716 to Fulghum et al. uses chip samples of a received signal for correlation estimation. This stands in contrast to the use of despread pilot values, e.g., despread Common Pilot Channel (CPICH) symbols, for impairment correlation estimation. The use of chip samples provides a much larger number of samples for correlation estimation over a given transmission interval, as compared to pilot symbols. With this approach, time filtering within a given signal interval can be more effective than time filtering within the interval using the much smaller set of pilot-derived correlations.

Parametric estimation represents another significant and extensively developed approach to the determination of impairment correlation estimations that track changing interference conditions, while exhibiting reduced estimation noise. In parametric estimation, rough, potentially noisy, measurements of actual impairment correlations are taken, but these measurements are not used for combining weight generation. Rather, they are used in a model fitting process, that uses least-squares or other processing to fit a parametric model of impairment correlations to the measurements. See, for example, U.S. Pub. 2007/0047628 A1, to Fulghum et al., which discloses parametric-based impairment correlation estimation in the context of Quadrature Amplitude Modulation (QAM) signal processing. Another parametric example is given in U.S. Pub. 2007/0253514, which recognizes the Toeplitz nature of a correlation-related matrix, based on the tap delay locations. This disclosure teaches the formation of a circulant matrix, which is special form of a Toeplitz matrix, and that specialized matrix is used for parametric estimation of impairment correlations.

Still further, it is known to perform both parametric and non-parametric processing within the same receiver, and to apply time filtering in this context, for improved impairment correlation estimation. See, for example, U.S. Pub. 2005/0215218 to Bottomley et al.

SUMMARY

According to the teachings disclosed in this document, a receiver estimates impairment correlations for a received signal using received pilot values. This direct estimation of impairment correlations based on direct pilot observations, provides for a rich capture of all impairment sources bearing on the received signal. Advantageously, however, estimation noise is reduced by generating a structured covariance matrix from the measured covariance matrix, and carrying out structured filtering within the structured covariance matrix. Structured filtering involves averaging matrix elements that correspond to the same processing delay difference as used for measured impairment correlation estimation. In one or more embodiments, averaged net channel estimates are used to obtain a rank one matrix, which is used to convert a measured covariance matrix to a structured covariance matrix, for carrying out structured filtering.

However, the present invention is not limited to the above summary of features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a plot of a delay grid as commonly used for equalization processing, shown in context with multipath propagation delays.

FIGS. 3-6 are example illustrations of the matrices involved in one or more embodiments of structured filtering, as taught herein for reducing the estimation noise in direct measurements of impairment correlations.

FIG. 7 is a plot of time filtering used in addition to structured filtering, for one or more embodiments of structured filtering as taught herein.

DETAILED DESCRIPTION

Figure 1:
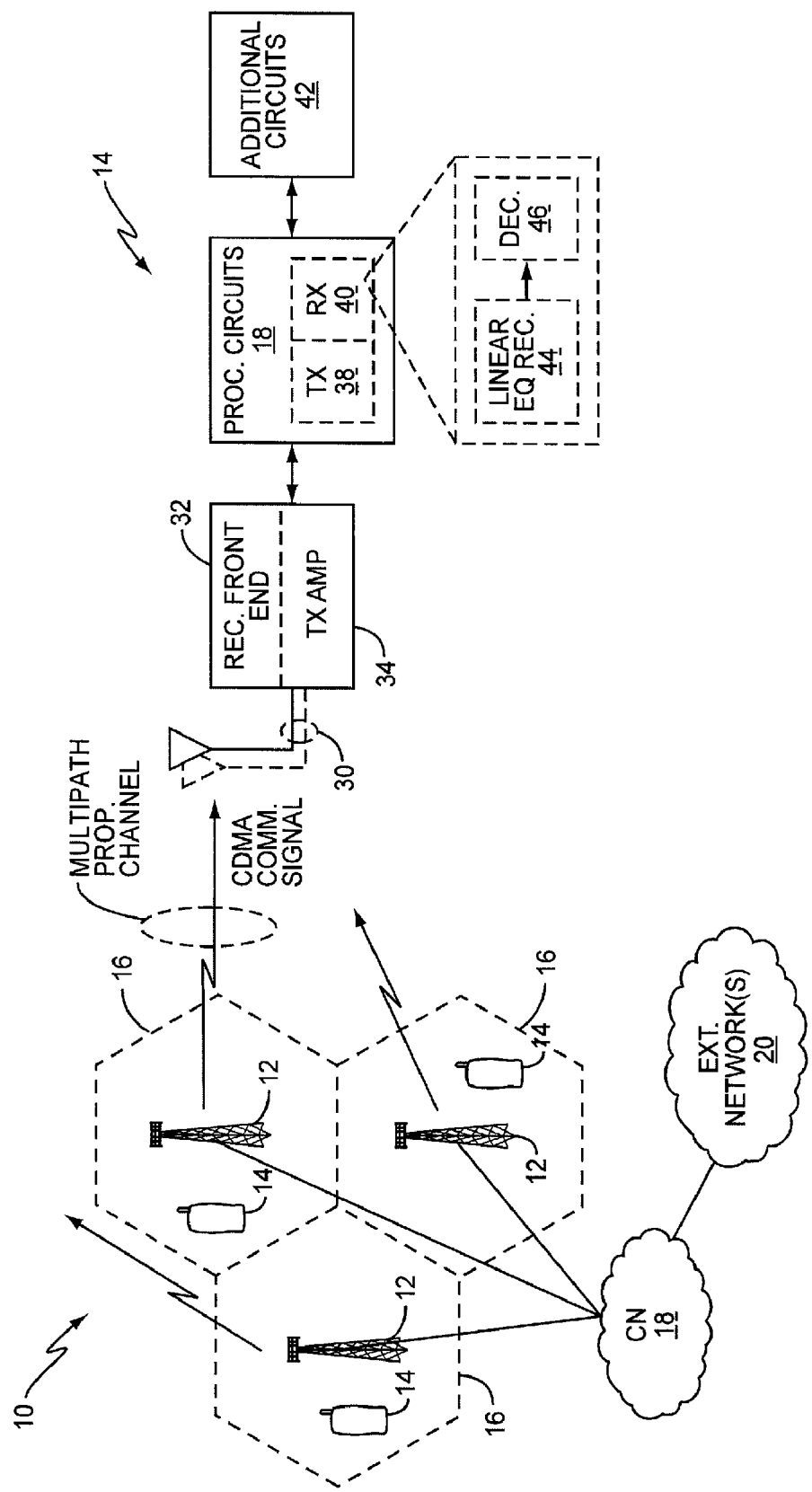
FIG. 1 is a block diagram of a one embodiment of a wireless communication device, operating in the context of a wireless communication network, wherein the device is configured for reducing estimation noise in direct measurements of impairment correlations for a received signal.

FIG. 1 illustrates one embodiment of a wireless communication network 10, such as a Wideband CDMA network, which includes a radio access network (RAN) comprising a number of base stations 12. Each base station 12 provides service to mobile terminals or other wireless communication devices 14 within one or more cells (or sectors) 16. The base stations 12 communicatively couple to a Core Network (CN) 18. In turn, the CN 18 communicatively couples to one or more external communication networks 20, such as the Internet and/or the Public Switched Telephone Network (PSTN).

A given one of the devices 14 is shown in example detail in FIG. 1, with an emphasis on one embodiment of receiver processing circuits configured to support the "structured filtering" as taught herein. The device 14 comprises one or more transmit/receive antennas 30, a receiver front-end circuit 32, a transmit amplifier circuit 34, one or more processing circuits 36, including baseband transmitter and receiver processing circuits 38 and 40, and one or more additional circuits 42. These additional circuits 42 include, for example, a system processor, user interface circuits, etc., as needed to fulfill the intended functionality of the device 14. In a non-limiting example, the device 14 is a cellular telephone, such as a data-capable smart phone or other mobile terminal.

Of particular interest, the receiver processing circuits 40 ("receiver 40") include a linear equalization circuit 44. In one embodiment, the linear equalization circuit 44 is a non-parametric Generalized Rake (G-Rake) receiver. Non-parametric G-Rakes base their interference suppression (signal whitening) on direct measurements of received signal impairment correlations, in contrast to the parametric impairment correlation models used by parametric G-Rake receivers.

As will be appreciated by those skilled in the art, the linear equalization circuit 44 operates as a received signal demodulator providing hard and/or soft symbol values to a decoder 46. The decoder 46 is configured to recover transmitted information bits by decoding the detected values provided by the linear equalization circuit 44. In the context of this arrangement, the receiver front-end circuit 32 is configured for receiving a CDMA communication signal—through a multipath propagation channel—that includes pilot symbols for channel estimation. The front-end circuit 32 outputs digital sample streams, e.g., baseband samples, representing the antenna-received communication signal, and the receiver 40 operate on these input digital streams.

As shown by way of example in FIG. 2, the communication signal is received through the multipath propagation channel on a number of path delays, $\tau_1, \tau_2, \tau_3$, and so on. Additionally, the linear equalization circuit 44 operates with a fixed equalization delay grid, meaning that the processing delays it uses for equalization processing lie at regularly spaced intervals, $d_1, d_2, d_3$, and so on. The linear equalization circuit 44 thus processes the received signal at selected processing delays on the defined grid, which are spaced apart on a fixed resolution that is tied, for example, to the "chip" timing used for spread-spectrum transmission of the received signal. Examples of grid spacing include a 1-chip grid, a ¾ chip grid, a ½ chip grid, etc.

With this delay grid in mind, the linear equalization circuit 44 comprises one or more processing circuits that are configured to generate averaged net channel estimates, $h^{mean}$, corresponding to a set of processing delays on the fixed equalization grid. It will be understood that $h^{mean}$ is a vector having a length corresponding to the number of individual processing delays at which channel estimates are determined. FIG. 3 depicts an example vector, where $h_1$ denotes the averaged net channel estimate for delay $d_1$, $h_2$ denotes the averaged net channel estimate for delay $d_2$, and so on.

The one or more processing circuits are further configured to generate a measured covariance matrix corresponding to the processing delays. This measured covariance matrix, denoted herein as $R^{meas}$, is based on measuring cross-correlations for the received signal between pairs of the processing delays. In at least one embodiment, generating the measured covariance matrix comprises subtracting mean values of received pilot symbols from received values of the pilot symbols, as determined for individual ones of the processing delays.

These subtractions provide difference values for each of the processing delays. The difference values are cross-correlated to obtain the elements of the measured covariance matrix $R^{meas}$. However, generated, the measured covariance matrix has dimensions set by the number of processing delays in use. FIG. 4 depicts an example measured covariance matrix, where matrix element $c_{11}$ denotes the autocorrelation of impairment at delay $d_1$, $c_{12}$ denotes the cross-correlation of impairment at delay $d_1$ with respect to delay $d_2$, and so on.

The linear equalization circuit 44 is further configured to compute a rank one matrix, denoted as B, as a function of the averaged net channel estimates. As an example, an outer product of the channel estimates is computed to obtain B. FIG. 5 depicts an example rank one matrix. Further, the processing circuits are configured to form a structured covariance matrix, $R^{struct}$, by adding the rank one matrix to the measured covariance matrix. FIG. 6 depicts an exampled structured correlation matrix.

Unlike the measured covariance matrix, $R^{meas}$, the structured covariance matrix $R^{struct}$ exhibits significant structure. To appreciate this difference, one must first understand that the matrix elements in $R^{meas}$ each represent the impairment covariance measured at a given processing delay, with respect to another processing delay. The value of each such matrix element depends on the relative delay differences between that given processing delay and the other processing delay. Each such element also depends on the given processing delay itself in terms of its absolute delay value. Thus, the matrix element $c_{12}$ will have a different value than the matrix element $c_{21}$, although they both are based on the same delay difference.

In contrast, the elements of $R^{struct}$ do not depend on the absolute delays, but rather depend only on the delay differences. That is, the matrix elements within $R^{struct}$ that correspond to the same delay difference should, absent noise or other measurement errors, have the same value. The elements for each such delay difference therefore can be averaged, which effectively filters them, and the averaged value can be substituted back into the matrix for those elements. This processing is referred to as "structured filtering."

The suppression of measurement noise via structured filtering allows for a "rich" capture of all interference sources contributing to correlated impairment in the filtered covariance matrix $R^{filt}$, while eliminating or greatly reducing the need for temporal filtering of such measurements over multiple time intervals. Advantageously, then, the method proposed herein uses structured filtering to obtain the filtered covariance matrix $R^{filt}$. Of course, further smoothing—at the expense of responsiveness to rapidly changing interference conditions—an be obtained by temporal filtering across succeeding time intervals of the received signal.

FIG. 7 illustrates temporal filtering, done in addition to structured filtering. More particularly, the linear equalization circuit 44 may be configured to obtain the filtered covariance matrix $R^{filt}$ based on generating the measured covariance matrix $R^{meas}$, computing the rank one matrix B, and forming the structured covariance matrix $R^{struct}$, including the averaging of elements in the structured covariance matrix, in each transmission time interval in a series of repeating transmission time intervals associated with the received signal. As an example, where the received signal is a WCDMA communication signal, the linear equalization circuit 44 generates an updated version of $R^{filt}$ in each transmission slot, and maintains a running average of $R^{filt}$ across the slots. Of course, exponential weighting can be used, to attenuate the contribution of $R^{filt}$ from older slots.

In any case, in at least one embodiment, further filtering for $R^{filt}$ is obtained by averaging the structured covariance matrix $R^{struct}$ and/or the filtered covariance matrix $R^{filt}$, as obtained from the structured covariance matrix, across the repeating transmission time intervals. Even so, the structured filtering performed within any given time interval means that less (or no) time averaging may be needed to obtain a desired level of measurement noise reduction. Eliminating or reducing the temporal filtering makes combining weight generation/interference suppression more responsive to changing reception conditions.

Of course, structured filtering as taught herein can be varied in other respects, too. With that flexibility in mind, FIG. 8 illustrates an example embodiment of a structured-filtering method as taught herein.

The illustrated processing is implemented, for example, by the linear equalization circuit 44, which, in one or more embodiments, comprises one or more microprocessors, digital signal processors, or other digital processing circuits. Such circuits operate as a machine particularly configured for measuring and filtering received signal impairment correlations as taught herein, and it will be understood that such processing involves the transformation of measured signal impairment correlations into filtered impairment correlation. This transformation involves the suppression of noise as manifested in the received signal processing path of the receiver 40.

It will also be understood that the structured filtering as taught herein is, in one or more embodiments, implemented at least in part based on the execution of stored computer program instructions by one or more digital processors. For example, the receiver 40 include, or are associated with, one or more memory circuits or other computer-readable mediums, storing computer program instructions for execution by the receiver 40.

Figure 8:
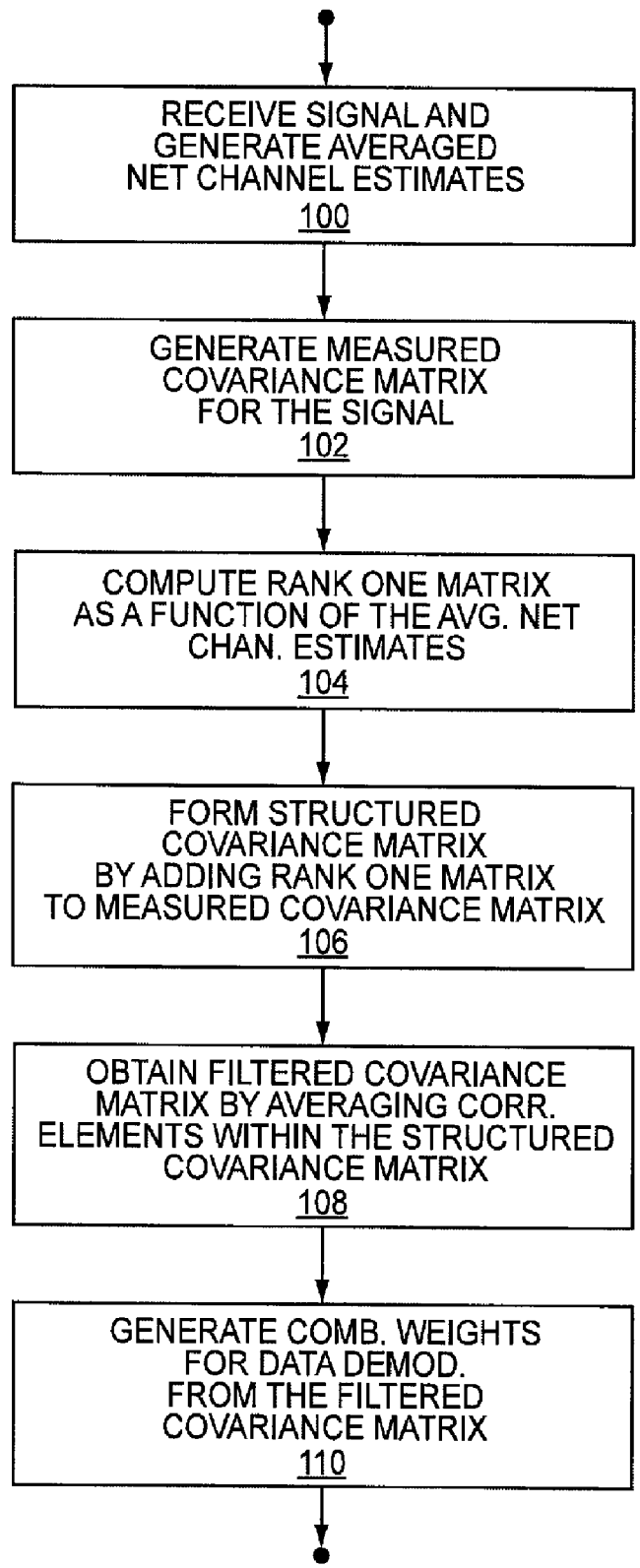
FIG. 8 is a logic flow diagram of one embodiment of a method for structured filtering.

With these considerations in mind, FIG. 8 illustrates a method of signal processing in linear equalizer operating with a fixed equalization delay grid. The method comprises receiving a CDMA communication signal that includes pilot symbols for channel estimation and generating averaged net channel estimates corresponding to a set of processing delays on the fixed equalization grid (Block 100). The method further includes generating a measured covariance matrix, $R^{meas}$. This matrix corresponds to the processing delays (e.g., $d_1$, $d_2$, ...), and is computed based on measuring cross-correlations for the received signal between pairs of the processing delays (Block 102).

In at least one embodiment, the received signal of interest is received on two or more receive antennas 30 of the device 14. Generating the measured covariance matrix in this case comprises generating the measured covariance matrix in block form. Each such block comprises a subset of elements in the overall measured covariance matrix, where each block corresponds to impairment correlations for a different antenna pairing. Thus, in at least one embodiment, the communication signal is received on two or more receive antennas 30 of the device 14, and generating the measured covariance matrix comprises generating the measured covariance matrix in block form, with each block comprising a subset of elements in the measured covariance matrix corresponding to impairment correlations for a different antenna pairing.

Regardless of single-antenna or multi-antenna reception, the method continues with computing a rank one matrix, B, as a function of the averaged net channel estimates (Block 104), and forming a structured covariance matrix, $R^{struct}$, by adding the rank one matrix to the measured covariance matrix (Block 106). In other words, the linear equalization circuit 44 uses the matrix B to perform a rank one update of the relatively unstructured matrix $R^{meas}$, to obtain the highly structured matrix $R^{struct}$.

In at least one embodiment, computing the rank one matrix B includes determining a scaling factor for the rank one matrix that is a ratio of total transmit power and pilot transmit power, as used by a base station 12 to transmit the communication signal being processed by the device 14. For example, the linear equalization circuit 44 is configured to form a series of linear equations that relate corresponding elements of the measured covariance matrix and the rank one matrix as a function of the ratio, and estimates the ratio as a least squares solution for the series of linear equations.

The method continues with obtaining the filtered covariance matrix, $R^{filt}$, by averaging elements in the structured covariance matrix that correspond to the same processing delay difference and replacing such elements with their average values (Block 108). Additionally, the method includes generating combining weights, w, for demodulating data symbols from the CDMA signal, from the filtered covariance matrix (Block 110).

Of course, the method embodiment depicted in FIG. 8 can be varied or extended. For example, in one or more embodiments, the linear equalization circuit 44 is configured to implement a method whereby it increases the degree of filtering provided for the filtered covariance matrix $R^{filt}$ by using a larger number of processing delays for channel estimation and covariance matrix generation than are used for demodulating data symbols from the CDMA signal. Here, the linear equalization circuit 44 generates the combining weights from a subset of the filtered covariance matrix that corresponds to the smaller number of processing delays used for demodulating the data symbols.

In at least one such embodiment, the fixed equalization delay grid comprises a first delay grid, and the linear equalization circuit 44 demodulates data symbols from the received signal using a second delay grid that is a subset of the first delay grid. In such embodiments, the linear equalization circuit 44 calculates the combining weights from a subset of the filtered covariance matrix that corresponds to the second delay grid (or otherwise operates to generate the filtered covariance matrix from a subset of the structured covariance matrix).

As an example, assume that the linear equalization circuit 44 uses forty processing delays for channel estimation and impairment correlation measurement. As such, h is a 1×40 (or 40×1) vector, $R^{meas}$ is a 40×40 matrix, B is a 40×40 matrix, and $R^{struct}$ is a 40×40 matrix. Further, assume that only twenty of the forty processing delays are used for data demodulation. In this case, $R^{filt}$ can be generated from, or otherwise taken as, a 20×20 matrix subset of $R^{struct}$ (after the averaging of elements within $R^{struct}$). Alternatively, $R^{filt}$ can be generated as a 40×40 matrix, and the appropriate 20×20 subset of $R^{filt}$ used for combining weight generation. As a further clarification on this point, and in a general sense, $R^{filt}$ may simply be $R^{struct}$, after the structured filtering is performed, or $R^{filt}$ may be derived from $R^{struct}$, such as by subtracting the rank one update matrix B from $R^{struct}$, after the structured filtering is performed.

In any case, using a larger number of processing delays for impairment correlation measurements results in a larger number of elements in $R^{struct}$. A larger population in $R^{struct}$ means that, in general, there will be more matrix elements corresponding to the same processing delay difference, for each delay of interest. Thus, for each such difference, there will be larger number of matrix elements to average and a greater degree of filtering is therefore achieved.

As for the structured filtering in a more general sense, in one or more embodiments, averaging elements in the structured covariance matrix comprises, for each processing delay difference of interest, identifying those matrix elements within sub-diagonals or super-diagonals of the structured covariance matrix that correspond to the same processing delay difference of interest. Processing continues, for each processing delay difference of interest, with computing an average of the identified matrix elements, and replacing the identified matrix elements with the average. Here, the processing delay differences of interest correspond to the pairs of processing delays used to generate the measured covariance matrix.

Once the averaging operations are completed for the associated subsets of matrix elements within $R^{struct}$, obtaining the filtered covariance matrix $R^{filt}$ comprises, as noted for one or more embodiments, subtracting the rank one matrix B from the structured covariance matrix $R^{struct}$, to obtain the filtered covariance matrix $R^{filt}$ as the result of said subtracting. However, as also noted, one or more other embodiments use the structured covariance matrix—after averaging—as the filtered covariance matrix. In either case, temporal filtering may be used in addition to structured filtering.

These and other contemplated variations may be better appreciated through the presentation of a practical example. In such an example, the receiver 40 may compute the covariance matrix elements of $R^{meas}$ using a known approach, such as by subtracting the net propagation channel mean values from the net propagation channel samples before cross-correlating. Here, the net channel is the medium propagation channel plus the effects of the receiver (Rx) and transmitter (Tx) filters. Such processing provides $R^{meas}$.

The receiver 40 then computes the rank one matrix B as $$B = \frac{\alpha}{\alpha_{Pilot}} h^{mean}(h^{mean})^H, \quad \text{Eq. (1)}$$

where $h^{mean}$ is the column vector containing the averaged net channel estimates using a pilot channel with energy $\alpha_{Pilot}$, and where $\alpha$ is the transmitted base-station power. For now, one may assume that the ratio $$\frac{\alpha}{\alpha_{Pilot}}$$

is known to the receiver 40. Later details provide examples of configuring the receiver 40 to estimate the ratio. For example, for 3GPP WCDMA implementations, the ratio is not signaled and therefore must be estimated by the receiver 40.

Adding the rank one matrix B to the measured covariance matrix $R^{meas}$ produces the resulting structured covariance matrix $R^{struct}$. Note that the receiver 40 could be configured to calculate $R^{struct}$ directly, up to a known scaling factor, such as by correlating the I/Q samples as incoming from the receiver front-end 32, before despreading. However, this approach less efficiently removes unwanted correlation between the mean values and the noise (other cell interference and radio noise). In any case, structured filtering of $R^{struct}$ is done to reduce the noise in its matrix entries. The amount of overall filtering (including structured and temporal) is a trade off between the amount of noise that can be tolerated in $R^{filt}$ versus the need for $R^{filt}$ to track potentially rapid changes in interference conditions bearing on signal reception at the device 14.

Assuming one receive antenna 30, one may observe that $R^{meas}$ and $R^{struct}$ are Hermitian—i.e., the conjugate of the transpose of the upper tri-diagonal part equals the lower tri-angular part. Because of this characteristic, the receiver 40 may be configured to compute only the upper or lower triangular part, and to mirror (copy) the results as appropriate. With this in mind, each element of $R^{struct}$ can be written as $$R_{ij}^{struct} = \alpha \sum_{l_1=1}^{L} \sum_{l_2=1}^{L} h_{l_1}^{med}(h_{l_2}^{med})^* \sum_{n=-\infty}^{\infty} \phi_{Rx-Tx}(n \cdot \Delta_{chip} + \tau_i - \hat{\tau}_{l_1}) \cdot \phi_{Rx-Tx}(n \cdot \Delta_{chip} + \tau_j - \hat{\tau}_{l_2}) + \beta \cdot \phi_{Rx-Rx}(\tau_i - \tau_j).$$

Eq. (2)

Here, the inner summation includes the n=0 term, meaning that the summation is symmetrical around zero, thereby imparting the difference-only dependency to the individual matrix elements of $R^{struct}$. Further, $\alpha$ and $\beta$ are scalar values modeling the base station transmitted power and the other cell interference, respectively. The variable $\Delta_{chip}$ represents the time span of one chip used in spreading the received signal. Still further, $\tau_i$ represents the equalization processing delays used for demodulating the received signal (these were earlier denoted as $d_1$, $d_2$, etc.), while $\hat{\tau}_l$ represents the propagation channel time delay for the l-th path of L propagation paths. Correspondingly, $h_l^{med}$ represents the medium propagation channel estimates corresponding to the l-th propagation time delay $\hat{\tau}_l$. Further, $\phi_{Rx-Tx}$ models the convolution of the Rx and Tx filters and $\phi_{Rx-Rx}$ models the convolution—autocorrelation—of the Rx filter.

It is straight-forward to show that if $\tau_i$ belong to a fixed grid, that is, if $|\tau_i - \tau_j| = |i-j| \cdot \Delta_{spacing}$, then there will be structure among the elements of $R^{struct}$. In particular, if $\Delta_{spacing}$ equals 1, all sub and super diagonal elements in $R^{struct}$ nominally will have the same value. (Practically, noise and other error sources will cause these corresponding matrix elements to have different numeric values.) Thus, for a fixed equalization grid spacing of 1 chip, $R^{struct}$ is a Toeplitz matrix.

Continuing, if $\Delta_{spacing}$ equals ½, every second element of the sub and super diagonal are the same. If $\Delta_{spacing}$ equals ¾, every fourth element of the sub and super diagonal are the same. In general, if $\Delta_{spacing}$ equals p/q (here p and q do not have any integer factors in common), every q element of the sub and super diagonal are the same.

Based on these structural patterns, the receiver 40 is configured to average the elements in $R^{struct}$ that nominally should have the same value. The result of this structured filtering is a less noisy $R^{struct}$ and consequently less temporal filtering (or none) is needed.

Further, in the special case of one receive antenna and $\Delta_{spacing}$ equals 1, the receiver circuit 40 may be configured to compute the received signal combining weights w based on implementing an equation involving the term $(R^{struct})^{-1} b$, for some vector b. Advantageously, the receiver 40 may be configured to first compute $(R^{struct})^{-1} b$ using Durbin's method. Such computations include $2N^2$ flops where N is the number of rows/columns of size of $R^{struct}$.

The receiver 40 then performs a rank one update to go from $(R^{struct})^{-1}b$ to $(R^{filt})^{-1}b$, at least for embodiments where $R^{filt}$ is obtained by subtracting B from $R^{struct}$ after structured filtering is performed within $R^{struct}$. The total number of flops is of the order of $2N^2$ compared to $N^3/3$ using a Cholesky method. The breakpoint when Durbin's method becomes more favorable is for $N \geq 6$.

Also, as noted, for cases where there is more than one receive antenna, the measured covariance matrix $R^{meas}$ can be structured in block form where each block is given by a pair of receive antennas. For example, if the device 14 has two receive antennas 30, the receiver circuit 40 may be configured to form $R^{meas}$ in block form as $$R^{meas} = \begin{pmatrix} R_{11}^{meas} & R_{12}^{meas} \\ R_{21}^{meas} & R_{22}^{meas} \end{pmatrix}, \quad \text{Eq. (3)}$$

where $R_{ij}^{meas}$ is given by the inner summation in Eq. (2), and where $h_{i_1}^{med}$ is computed based on antenna i and $h_{i_2}^{med}$ computed based on antenna j. The receiver 40 thus can average a subset, depending on $\Delta_{spacing}$, of the sub/super diagonal entries of each $R_{ij}^{struct}$ in the correspondingly block-based $R^{struct}$.

It is readily seen that the number of matrix elements in each sub/super diagonal of $R^{struct}$ diminishes the further away one moves from the main diagonal. Consequently, less averaging and noise reduction is available close to the corner elements of $R^{struct}$. In at least one embodiment, therefore, individualized time filtering is done for the different averaged sub/super diagonal elements. That is, the amount of time filtering applied by the receiver 40 to a given subset of elements within $R^{struct}$ is a function of the number of elements in each sub/super diagonal. In an alternative embodiment, the receiver 40 is configured to set sub/super diagonal elements far away from the main diagonal of $R^{struct}$ to zero.

Also, as noted, at least where the receiver 40 has sufficient processing power, two fixed grids can be used, where the second grid is a subset of the first one. Using a received WCDMA communication signal, including a Common Pilot Channel (CPICH) with CPICH symbols, demodulation of data is done using the delay positions in the second fixed grid. The first grid is only despread for the CPICH and used to build $R^{meas}$ and $R^{struct}$. Using a larger number of delays creates a larger $R^{struct}$, and therefore provides more sub/super diagonal elements for averaging, and less time filtering, if any, has to be used.

With this approach, the covariance matrix to use for demodulation is a subset of the elements $R^{struct}$. For example, if the second grid is centered on the larger first grid, the covariance matrix to use for demodulation is given by the center part of the $R^{struct}$ matrix. Advantageously, only the sub/super diagonal elements far away from the main diagonal have unduly limited numbers of matrix elements to average, and these distant subset are not relevant to the second fixed grid.

As for the ratio needed to form the rank one matrix B, the receiver 40 can be configured to estimate the ratio using any one of several advantageous techniques. In one embodiment, the estimation technique adopted by the receiver 40 assume the ratio $$\frac{\alpha}{\alpha_{Pilot}}$$

is an unknown value, denoted as x. Based on its configured understanding of the structure in $R^{struct}$, where certain elements $R^{struct}$ are supposed to have the same value, the receiver 40 forms as series of (linear) equations involving x as $$a_i + b_i x = a_j + b_j x \quad \text{Eq. (4)}$$

for a set of indexes i and j belonging to a set $I_k$. Here the index k enumerates the sets of $I_k$, which, for a given k, indicates the set of matrix elements in $R^{struct}$ that are nominally equal. Further, the elements $a_i$ maps to elements in the matrix $R^{meas}$ and $b_i$ maps to elements in the rank one matrix B—i.e., it maps to elements in the matrix computed as $h^{mean}(h^{mean})^H$.

In at least one embodiment, the receiver 40 is configured to solve for x by averaging the equations and solving a minimum square problem. That is, the receiver 40 is configured to solve for x in $$\min_x \sum_{k \in D} \sum_{i \in I_k} |a_i + b_i x - a^{mean,k} - b^{mean,k} x|^2, \quad \text{Eq. (5)}$$

where $$a^{mean,k} = \frac{1}{|I_k|} \sum_{i \in I_k} a_i, \quad \text{Eq. (6)}$$

and $$b^{mean,k} = \frac{1}{|I_k|} \sum_{i \in I_k} b_i. \quad \text{Eq. (7)}$$

In Eq. (5), D represents the number of sets $I_k$ that the receiver 40 includes in the calculation.

In another embodiment, the receiver 40 is configured to determine the ratio $$\frac{\alpha}{\alpha_{pilot}}$$

by computing $R^{struct}$ before Rake combining as well as $R^{meas}$, based on the CPICH. Computing $R^{struct}$ before the Rake combining means that each matrix element consists of the multiplication of two chips given by two different time delays averaged over time (correlation). $R^{meas}$ is computed by despreading the CPICH for a number of delays and then computing the covariance matrix as described in the earlier discussion of FIGS. 2 and 3. The difference between $R^{struct}$ and $R^{meas}$, call it $\Delta$, is given by $$\frac{\alpha}{\alpha_{Pilot}} h^{mean}(h^{mean})^H.$$

Because $h^{mean}$, the net channel estimates, are based on CPICH, the receiver 40 can divide each element of $\Delta$ with the corresponding element in the matrix $h^{mean}(h^{mean})^H$, followed by averaging.

The above calculations, or variations of them, enable the receiver 40 to estimate the scaling ratio needed to form the rank one update matrix B, when operating in network types that do not signal such information, e.g., WCDMA-based networks. Of course, the receiver 40 is not limited to these example calculations, and other methods, including receiving signaled information, are contemplated herein. Further, these and other computations are adapted to the particulars of the receiver implementation. As noted, the receiver 40 generally includes a linear equalization circuit 44, which is configured, for example, as a non-parametric G-Rake receiver.

Figure 9:
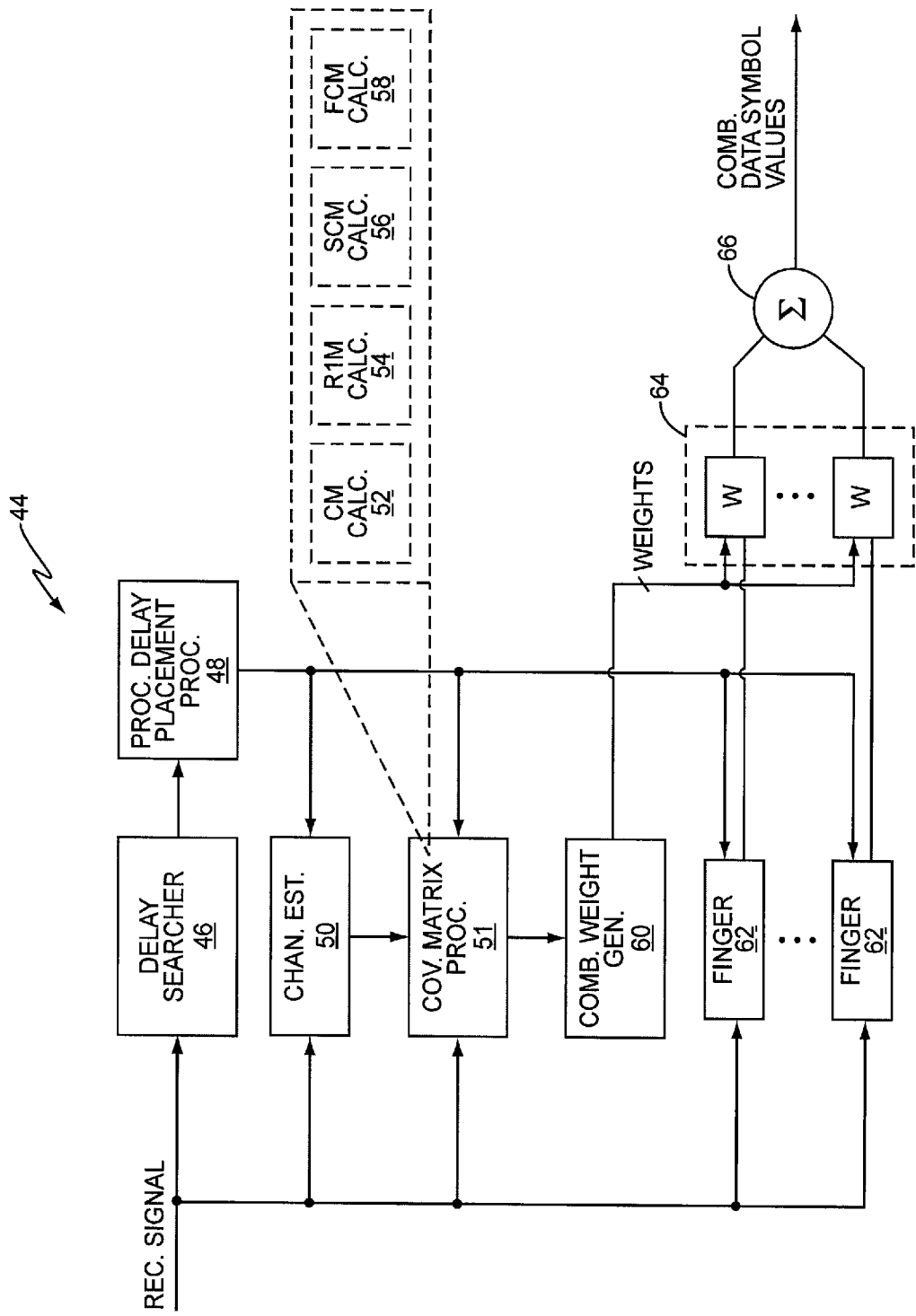
FIG. 9 is a block diagram of one embodiment of a non-parametric Generalized Rake (G-Rake) receiver, configured for structured filtering.

An example G-Rake implementation is shown in FIG. 9. The illustrated processing circuits of the linear equalization circuit 44 include a delay searcher 46 that is configured to identify multipath delays for a received communication signal. An associated processing delay placement processor 48 that is configured to identify the processing delays (on the fixed grid) to be used for processing multipath components of the received communication signal. The delay placement processor 48 can be understood as a finger placement processor, that time aligns (places) the Rake fingers used to demodulate pilot and data symbols from the received signal.

For example, the delay searcher 46 dynamically generates a Power Delay Profile (PDP) for the received signal, and the placement processor 48 sets/updates the processing delays used for processing the received signal. To do so, the placement processor 48 may select a number of delays closest to identified multipath peaks, and a number of other delays away from those peaks, for interference characterization. This interference characterization, represented by the impairment correlation estimates, provides the basis for generating combining weights that suppress colored (correlated) interference.

The linear equalization circuit 44 further includes a channel estimation circuit 50 that is configured to generate the averaged net channel estimates, and a covariance matrix processor 51 to generate the various covariance-related matrices described herein. In one embodiment, the covariance matrix processor includes a covariance matrix (CM) calculator 52 that is configured to generate the measured covariance matrix $R^{meas}$, a rank one matrix (R1M) calculator 54 configured to compute the rank one matrix B, a structured covariance matrix (SCM) calculator 56 configured to form the structured covariance matrix $R^{struct}$, and a filtered covariance matrix (FCM) calculator 58 configured to obtain the filtered covariance matrix $R^{filt}$. The linear equalization circuit 44 also includes a combining weight generator 60 configured to generate the combining weights w, for combining despread data symbol values obtained from a number of Rake fingers 62.

Each finger 62 outputs despread values corresponding to the received signal as despread at a given one of the processing delays, and a set of combining weight circuits apply corresponding ones of the combining weights in the combining weight vector w, and the resultant weighted finger outputs are combined in a combiner 66, to produce a Rake-combined signal for decoding. (Those skilled in the art will appreciate that the channel estimation circuit 50 also includes a plurality of Rake fingers, each aligned with a given processing delay and used for generating channel estimates on that delay.)

As will be understood by those skilled in the art, the Rake-combined signal output by the combiner 66 is whitened in the sense that the combining weights w suppress colored interference. Of course, the linear equalization circuit 44 can be implemented as a Chip Equalizer (CE) circuit, wherein a serial shift register includes a tap output for each delay stage, such that any given tap corresponds to a defined processing delay. In this manner, the different taps of the shift register provides chip-rate samples at different delays. Further, a tap selection circuit determines which taps to combine, and a the combining weights are then used to weight the contributions from the selected taps—just as the weights are used to weight finger contributions in the G-Rake. The weighted taps outputs—i.e., the chip-rate samples from the selected taps, as weighted by respective ones of the combining weights—are then combined to obtain a whitened combined signal, and that signal is then despread and provided for decoding.

Thus, in one or more embodiments, the method and apparatus disclosed in this document reduce the amount of temporal (time) filtering needed for estimating covariance for a received signal, thereby extending the range in the Doppler domain where non-parametric G-Rake and other equivalent techniques can be used. Advantageously, because the non-parametric G-Rake is, as a general proposition, computationally simpler than a parametric G-Rake, the teachings herein allow more fingers to be used for a given amount of computational processing power. This advantage allows the use of non-parametric G-Rake for much higher Doppler speeds than are practical for conventional non-parametric G-Rakes. Of course, the receiver 40 could be configured to revert to parametric G-Rake operation above a given Doppler speed threshold. Alternatively, the receiver 40 can be configured to always use non-parametric G-Rake processing (including the structured filtering taught herein), but to adapt the amount of structured filtering and/or temporal filtering used, as a function of Doppler speed.

Again, the structural filtering is based on the recognition that certain subsets of elements in the structured correlation matrix $R^{struct}$ nominally are identical, if the fingers (delays) used for demodulation are selected on a fixed grid. Nominally identical entries in this matrix, which correspond to sampling at different points in time, can be averaged, thus reducing or eliminating the need for time filtering of the correlation matrix.

Broadly, in one or more CDMA embodiments, the receiver 40 computes the measured covariance matrix $R^{meas}$ for a fixed grid using the CPICH. The receiver 40 adds a rank one matrix B, as scaled by a scaling factor x, to $R^{meas}$, to obtain the structured covariance matrix $R^{struct}$. This new matrix has maximum structure—it is Toeplitz—if a fixed grid spacing of 1 chip is used, but it is still highly structured for other grid spacings, such as ½ chip.

The above processing includes estimation of the scaling factor x, where such estimation in one or more embodiments relies only on $R^{meas}$ and B, both of which are readily estimated by the receiver 40, as part of the overall process. And, overall, such processing includes performing structured filtering within $R^{struct}$, which is based on averaging across the elements in $R^{struct}$ that are nominally the same. The receiver 40 then subtracts the rank one matrix to recover the original measured covariance matrix before using it to solve for combining weights, or, alternatively, bases combining weight generation on $R^{struct}$ after averaging.

Accordingly, the present invention is not limited by the foregoing discussion of example embodiments, or by the accompanying drawings. Rather, the present invention is limited only by the following appended claims, and their legal equivalents.

What is claimed is:

1. A method of signal processing in a linear equalization receiver operating with a fixed equalization delay grid, the method comprising:
  receiving a CDMA communication signal that includes pilot symbols for channel estimation and generating averaged net channel estimates corresponding to a set of processing delays on the fixed equalization grid;

generating a measured covariance matrix corresponding to the processing delays, based on measuring cross-correlations for the CDMA communication signal between pairs of the processing delays;

computing a rank one matrix as an outer product of the averaged net channel estimates;

forming a structured covariance matrix by adding the rank one matrix to the measured covariance matrix; and obtaining a filtered covariance matrix by averaging elements in the structured covariance matrix that correspond to like differences in the processing delays and replacing such elements with their average values; and generating combining weights, for demodulating data symbols from the CDMA signal, from the filtered covariance matrix.

2. The method of claim 1, further comprising increasing the degree of filtering provided for the filtered covariance matrix by using a larger number of processing delays for channel estimation and covariance matrix generation than are used for demodulating data symbols from the CDMA signal, and generating the combining weights from a subset of the filtered covariance matrix that corresponds to the smaller number of processing delays used for demodulating the data symbols.

3. The method of claim 1, wherein the fixed equalization delay grid comprises a first delay grid, and further comprising demodulating data symbols from the CDMA communication signal using a second delay grid that is a subset of the first delay grid, and wherein said generating the combining weights comprises calculating the combining weights from a subset of the filtered covariance matrix that corresponds to the second delay grid.

4. The method of claim 1, wherein computing the rank one matrix includes determining a scaling factor for the rank one matrix that is a ratio of total transmit power and pilot transmit power, as used by a communication network base station to transmit the CDMA communication signal.

5. The method of claim 4, further comprising estimating the ratio by forming a series of linear equations that relate corresponding elements of the measured covariance matrix and the rank one matrix as a function of the ratio, and estimating the ratio as a least squares solution for the series of linear equations.

6. The method of claim 1, where the CDMA signal is received on two or more receive antennas, and wherein generating the measured covariance matrix comprises generating the measured covariance matrix in block form, with each block comprising a subset of elements in the measured covariance matrix corresponding to impairment correlations for a different antenna pairing.

7. The method of claim 1, wherein obtaining the filtered covariance matrix comprises subtracting the rank one matrix from the structured covariance matrix after said averaging, to obtain the filtered covariance matrix as the result of said subtracting.

8. The method of claim 1, wherein obtaining the filtered covariance matrix includes generating the measured covariance matrix, computing the rank one matrix, and forming the structured covariance matrix, including the averaging of elements in the structured covariance matrix, in each transmission time interval in a series of repeating transmission time intervals associated with the CDMA communication signal, and further includes averaging the structured covariance matrix or the filtered covariance matrix, as obtained from the structured covariance matrix, across the repeating transmission time intervals.

9. The method of claim 1, wherein averaging elements in the structured covariance matrix comprises, for each processing delay difference of interest, identifying those matrix elements within sub-diagonals or super-diagonals of the structured covariance matrix that correspond to the same processing delay difference of interest, computing an average of the identified matrix elements, and replacing the identified matrix elements with the average, wherein the processing delay differences of interest correspond to the pairs of processing delays used to generate the measured covariance matrix.

10. The method of claim 1, further comprising demodulating data symbols from the CDMA signal by obtaining despread data symbol values for all or a subset of the processing delays, and combining the despread data symbol values using the combining weights generated from the filtered covariance matrix, or demodulating data symbols from the CDMA signal by obtaining chip-rate samples at all or a subset of the processing delays, obtaining a combined signal by combining the chip-rate samples as weighted by the combining weights generated from the filtered covariance matrix, and despreading the combined signal.

11. The method of claim 1, wherein generating the measured covariance matrix comprises subtracting mean values of received pilot symbols from received values of the pilot symbols, as determined for individual ones of the processing delays, to obtain difference values for the processing delays, and cross-correlating those difference values to obtain the elements of the measured covariance matrix.

12. A wireless communication device comprising:

a receiver front-end circuit for receiving a CDMA communication signal that includes pilot symbols for channel estimation; and a linear equalization circuit configured to operate with a fixed equalization delay grid and comprising one or more processing circuits configured to:

generate averaged net channel estimates corresponding to a set of processing delays on the fixed equalization grid;

generate a measured covariance matrix corresponding to the processing delays, based on measuring cross-correlations for the CDMA communication signal between pairs of the processing delays;

compute a rank one matrix as an outer product of the averaged net channel estimates;

form a structured covariance matrix by adding the rank one matrix to the measured covariance matrix; and obtain a filtered covariance matrix by averaging elements in the structured covariance matrix that correspond to like differences in the processing delays and replacing such elements with their average values; and generate combining weights, for demodulating data symbols from the CDMA signal, from the filtered covariance matrix.

13. The wireless communication device of claim 12, wherein the linear equalization circuit includes:

a channel estimation circuit configured to generate the averaged net channel estimates;

a covariance matrix calculator configured to generate the measured covariance matrix;

a rank one matrix calculator configured to compute the rank one matrix;

a structured covariance matrix calculator configured to form the structured covariance matrix;

a filtered covariance matrix calculator configured to obtain the filtered covariance matrix; and a combining weight calculator configured to generate the combining weights.

14. The wireless communication device of claim 12, wherein the linear equalization circuit comprises a Generalized Rake (GRAKE) receiver circuit or a chip equalizer.

15. The wireless communication device of claim 12, wherein the one or more processing circuits are configured to increase the degree of filtering provided by the filtered covariance matrix by using a larger number of processing delays for channel estimation and covariance matrix generation than are used for demodulating data symbols from the CDMA signal, and generating the combining weights from a subset of the filtered covariance matrix that corresponds to the smaller number of processing delays used for demodulating the data symbols.

16. The wireless communication device of claim 12, wherein the fixed equalization delay grid comprises a first delay grid, and wherein the one or more processing circuits are configured to demodulate data symbols from the CDMA communication signal using a second delay grid that is a subset of the first delay grid, and to calculate the combining weights from a subset of the filtered covariance matrix that corresponds to the second delay grid.

17. The wireless communication device of claim 12, wherein the one or more processing circuits are configured to determine a scaling factor for the rank one matrix, as part of computing the rank one matrix, where the scaling factor is a ratio of total transmit power and pilot transmit power, as used by a communication network base station to transmit the CDMA signal.

18. The wireless communication device of claim 17, wherein the one or more processing circuits are configured to estimate the ratio by forming a series of linear equations that relate corresponding elements of the measured covariance matrix and the rank one matrix as a function of the ratio, and estimating the ratio as a least squares solution for the series of linear equations.

19. The wireless communication device of claim 12, where the CDMA signal is received on two or more receive antennas, and wherein the one or more processing circuits are configured to generate the measured covariance matrix in block form, with each block comprising a subset of elements in the measured covariance matrix corresponding to impairment correlations for a different antenna pairing.

20. The wireless communication device of claim 12, wherein the one or more processing circuits are configured to obtain the filtered covariance matrix by subtracting the rank one matrix from the structured covariance matrix after said averaging, to obtain the filtered covariance matrix as the result of said subtracting.

21. The wireless communication device of claim 12, wherein the one or more processing circuits are configured to obtain the filtered covariance based on generating the measured covariance matrix, computing the rank one matrix, and forming the structured covariance matrix, including said averaging of elements in the structured covariance matrix, in each transmission time interval in a series of repeating transmission time intervals associated with the CDMA communication signal, and further by averaging the structured covariance matrix or the filtered covariance matrix, as obtained from the structured covariance matrix, across the repeating transmission time intervals.

22. The wireless communication device of claim 12, wherein the one or more processing circuits are configured to average elements in the structured covariance matrix by, for each processing delay difference of interest, identifying those matrix elements within a sub-diagonal or super-diagonal of the structured covariance matrix that correspond to the same processing delay difference of interest, computing an average of the identified matrix elements, and replacing the identified matrix elements with the average, wherein the processing delay differences of interest correspond to the pairs of processing delays used to generate the measured covariance matrix.

23. The wireless communication device of claim 12, wherein the one or more processing circuits are configured to demodulate data symbols from the CDMA signal by obtaining despread data symbol values for all or a subset of the processing delays, and combining the despread data symbol values using the combining weights generated from the filtered covariance matrix, or are configured to demodulate data symbols from the CDMA signal by obtaining chip-rate samples at all or a subset of the processing delays, obtaining a combined signal by combining the chip-rate samples as weighted by the combining weights generated from the filtered covariance matrix, and despreading the combined signal.

24. The wireless communication device of claim 12, wherein the one or more processing circuits are configured to generate the measured covariance matrix by subtracting mean values of received pilot symbols from received values of the pilot symbols, as determined for individual ones of the processing delays, to obtain difference values for the processing delays, and cross-correlating those difference values to obtain the elements of the measured covariance matrix.

* * * * *

UNITED STATES PATENT AND TRADEMARK OFFICE
CERTIFICATE OF CORRECTION

| | | |
|---|---|---|
| PATENT NO. | : 8,218,606 B2 | |
| APPLICATION NO. | : 12/423480 | |
| DATED | : July 10, 2012 | |
| INVENTOR(S) | : Jonsson | |

It is certified that error appears in the above-identified patent and that said Letters Patent is hereby corrected as shown below:

IN THE SPECIFICATIONS:

In Column 4, Line 58, delete "an" and insert -- can --, therefor.

Signed and Sealed this
Sixth Day of November, 2012

David J. Kappos
*Director of the United States Patent and Trademark Office*